(12) United States Patent
Koo et al.

(10) Patent No.: US 12,433,295 B2
(45) Date of Patent: Oct. 7, 2025

(54) SMALL-SCALE ROBOTS FOR BIOFILM ERADICATION

(71) Applicant: THE TRUSTEES OF THE UNIVERSITY OF PENNSYLVANIA, Philadelphia, PA (US)

(72) Inventors: Hyun Koo, Philadelphia, PA (US); Kathleen Stebe, Penn Valley, PA (US); Vijay Kumar, Wilmington, DE (US); Elizabeth Hunter, Philadelphia, PA (US); Edward Steager, Media, PA (US); Evan Brink, Philadelphia, PA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 1101 days.

(21) Appl. No.: 17/291,326

(22) PCT Filed: Nov. 25, 2019

(86) PCT No.: PCT/US2019/062941
§ 371 (c)(1),
(2) Date: May 5, 2021

(87) PCT Pub. No.: WO2020/112601
PCT Pub. Date: Jun. 4, 2020

(65) Prior Publication Data
US 2022/0000119 A1  Jan. 6, 2022

Related U.S. Application Data

(60) Provisional application No. 62/772,306, filed on Nov. 28, 2018.

(51) Int. Cl.
*A01N 59/16* (2006.01)
*A01N 25/04* (2006.01)
(Continued)

(52) U.S. Cl.
CPC ............. *A01N 59/16* (2013.01); *A01N 25/04* (2013.01); *A61K 6/52* (2020.01); *C12N 9/2405* (2013.01);
(Continued)

(58) Field of Classification Search
None
See application file for complete search history.

(56) References Cited

U.S. PATENT DOCUMENTS

2008/0255498 A1  10/2008  Houle
2010/0233224 A1   9/2010  Ramadurai et al.
(Continued)

FOREIGN PATENT DOCUMENTS

| CN | 108473916 A | 8/2018 |
|---|---|---|
| JP | 2018-510136 A | 4/2018 |

(Continued)

OTHER PUBLICATIONS

Extended European search report dated Jul. 25, 2022 in Application No. EP19890194.
(Continued)

*Primary Examiner* — Nicole P Babson
(74) *Attorney, Agent, or Firm* — Baker Botts L.L.P.

(57) ABSTRACT

Systems and methods for eradicating biofilms by killing bacteria within a biofilm, degrading the matrix and removing biofilm debris are disclosed herein. The disclosed subject matter provides techniques for administering a suspension of $H_2O_2$ and iron oxide nanoparticles to substantially eradicate bacteria within a biofilm matrix and degrade the bio film matrix, actuating the iron oxide nanoparticles for assembly into biohybrid robots suitable for removal of biofilm debris, and moving the biohybrid robots to remove the bio film debris from accessible or enclosed surfaces. In some embodiments, the disclosed subject matter can include
(Continued)

embedding iron oxide nanoparticles in a hydrogel to form a soft robotic structure, administering the soft robotic structure to a biofilm-covered location, and magnetizing the soft robot structure to substantially eradicate bacteria within a biofilm matrix, degrade the biofilm matrix, and remove biofilm debris from enclosed surfaces.

9 Claims, 13 Drawing Sheets

(51) Int. Cl.
| | | |
|---|---|---|
| A61K 6/52 | (2020.01) | |
| B82Y 25/00 | (2011.01) | |
| C12N 9/24 | (2006.01) | |
| C12N 9/46 | (2006.01) | |
| F03G 7/00 | (2006.01) | |
| H01F 1/36 | (2006.01) | |
| B82Y 35/00 | (2011.01) | |
| B82Y 40/00 | (2011.01) | |

(52) U.S. Cl.
CPC ........... *C12N 9/2454* (2013.01); *F03G 7/017* (2021.08); *H01F 1/36* (2013.01); *B82Y 25/00* (2013.01); *B82Y 35/00* (2013.01); *B82Y 40/00* (2013.01); *C12Y 302/01011* (2013.01); *C12Y 302/01059* (2013.01)

(56) References Cited

U.S. PATENT DOCUMENTS

| | | |
|---|---|---|
| 2014/0093550 A1 | 4/2014 | McNealy et al. |
| 2018/0027417 A1 | 1/2018 | Furuya |
| 2018/0028417 A1 | 2/2018 | Koo et al. |

FOREIGN PATENT DOCUMENTS

| | | |
|---|---|---|
| JP | 7601766 B2 | 12/2024 |
| WO | WO 2016/130985 A1 | 8/2016 |

OTHER PUBLICATIONS

Hwang et al., "Catalytic antimicrobial robots for biofilm eradication," Science Robotics, 4(29):1-26 (2019).
International Search Report mailed Feb. 10, 2020 in International Application No. PCT/US19/62941.
Li et al., "Clinical application of robots in dentistry: A scoping review," Journal of Prosthodontic Research, 68(2): 193-205 (2023).

FIG. 13A

SMALL-SCALE ROBOTS FOR BIOFILM ERADICATION

CROSS-REFERENCE TO RELATED APPLICATIONS

This application is a U.S. National Stage Patent Application under 35 U.S.C. § 371 of International Application No. PCT/US2019/062941, filed on Nov. 25, 2019, which claims priority from U.S. Provisional Patent No. 62/772,306, filed Nov. 28, 2018, the contents of which is are incorporated by reference herein in their entirety.

STATEMENT REGARDING FEDERALLY SPONSORED RESEARCH

This invention was made with government support under grant number R01 DE025848 awarded by the National Institutes of Health (NIH). The government has certain rights in the invention.

BACKGROUND

Biofilms are structured communities of bacterial cells surrounded by a matrix of extracellular polymeric substances attached to a surface. Biofilms can be formed on biotic surfaces such as teeth and mucosal surfaces, as well as abiotic surfaces such as implanted medical devices and catheters, thereby leading to infections and medical complications in patients. Biofilms can also exist in natural and industrial settings. For example, biofilms can contaminate man-made aquatic systems such as cooling towers, pools and spas. In the industrial setting, biofilms can develop on the interiors of pipes that can lead to clogs and corrosion. The extracellular matrix of such biofilms can contain polymeric substances, such as exopolysaccharides (EPS), which is a complex and mechanically stable scaffold that provides cohesion/adhesion and acts as a barrier to antibacterial drugs, protecting bacteria within them.

Certain techniques for combating biofilms are largely ineffective because they fail to both eradicate and remove biofilms, which leads to reinfection. Antimicrobial approaches, such as antibiotics and immune responses, can fail to address the complex structural and biological properties of biofilm, and the biofilm retains the ability to rapidly reestablish itself if biofilm debris and bacteria are not removed.

Accordingly, there exists a need for a technique to effectively substantially eradicate bacteria within a biofilm matrix, degrade the biofilm matrix, and remove any resulting biofilm debris.

SUMMARY

Systems and methods using small-scale robotics to eradicate bacteria within a biofilm matrix are disclosed herein.

The disclosed subject matter provides techniques for administering a suspension of $H_2O_2$ and iron oxide nanoparticles to substantially eradicate bacteria within a biofilm matrix and degrade the biofilm matrix, actuating the iron oxide nanoparticles for assembly into biohybrid robots suitable for removal of biofilm debris caused by biofilm degradation, and moving the biohybrid robots to remove the biofilm debris from a surface. In some embodiments, the suspension can be formulated with between 500 micrograms and 5000 micrograms of iron oxide nanoparticles per milliliter of 50% glycerol. In some embodiments, the suspension can be formulated with enzymes, including mutanase, dextranase, DNase, protease, lipase, amyloglucosidade, glucose oxidase, or combinations thereof, to degrade the biofilm matrix. For example, the suspension can be formulated with 1% $H_2O_2$ and 1.75 U/8.75 U mutanase/dextranase to substantially eradicate the bacteria and degrade the biofilm matrix.

In some embodiments, a permanent magnet or an array of electromagnets can apply a magnetic field from the permanent magnet to the biofilm to actuate the iron oxide nanoparticles to assemble into biohybrid robots. In some embodiments, the magnetic field can move the biohybrid robots to remove the biofilm debris from a surface (e.g., biofilm removal from biotic and abiotic surfaces, including dental, dentures, implants, windows or other glass, plastic surfaces where biofilms can form).

In some embodiments, the disclosed subject matter can include embedding iron oxide nanoparticles in a hydrogel to form a soft robotic structure to performed specific tasks to remove biofilms from enclosed surfaces. In some embodiments, the hydrogel can be a stimuli-responsive polymer. The soft robotic structure can be 3% weight by volume agar and 10% weight by volume iron oxide nanoparticles. For example, the soft robotic structure, which can realign with a magnetic field direction, can be magnetized along its short axis.

In some embodiments of the disclosed subject matter, the soft robotic structure can be vane-shaped to scrape biofilms from a wall of an enclosed surface and displace the biofilm debris. In some embodiments, the soft robotic structure can be double helicoid-shaped to drill through biofilm occlusions and clear biofilm from walls. The disclosed techniques can be applied to eradicate bacteria within a biofilm matrix, degrade the matrix and remove biofilm debris on biotic surfaces such as teeth and mucosal surfaces, as well as abiotic surfaces such as implanted medical devices and catheters, or surgical instruments including endoscopes, cannulas/cannulae thereby preventing infections and medical complications in patients. Furthermore, the disclosed techniques can be applied to eradicate bacteria within a biofilm matrix, degrade the matrix and remove biofilm debris in natural and industrial settings such as man-made aquatic systems (e.g., cooling towers, pools, aquariums and spas), glass/plastic surfaces including windows and food packaging and the interiors of pipes, water lines and other enclosed surfaces.

The accompanying drawings, which are incorporated and constitute part of this disclosure, illustrate preferred embodiments of the invention and serve to explain the principles of the invention.

Throughout the drawings, the same reference numerals and characters, unless otherwise stated, are used to denote like features, elements, components or portions of the illustrated embodiments. Moreover, while the present invention will now be described in detail with reference to the FIGS., it is done so in connection with the illustrative embodiments.

DETAILED DESCRIPTION

Techniques for eradicating biofilms using iron oxide nanoparticles to substantially eradicate bacteria within a biofilm matrix, degrade the biofilm matrix, and remove biofilm debris caused by biofilm eradication are presented. The iron oxide nanoparticles are administered to a biofilm-covered surface in a suspension or as a soft robotic structure. Once the iron oxide nanoparticles are administered, the catalytic function of the iron oxide nanoparticles substantially eradicates the bacteria and degrades the biofilm matrix. The magnetic function of the iron oxide nanoparticles is activated to actuate the iron oxide nanoparticles for assembly suitable for removal of the biofilm debris.

Figure 1:
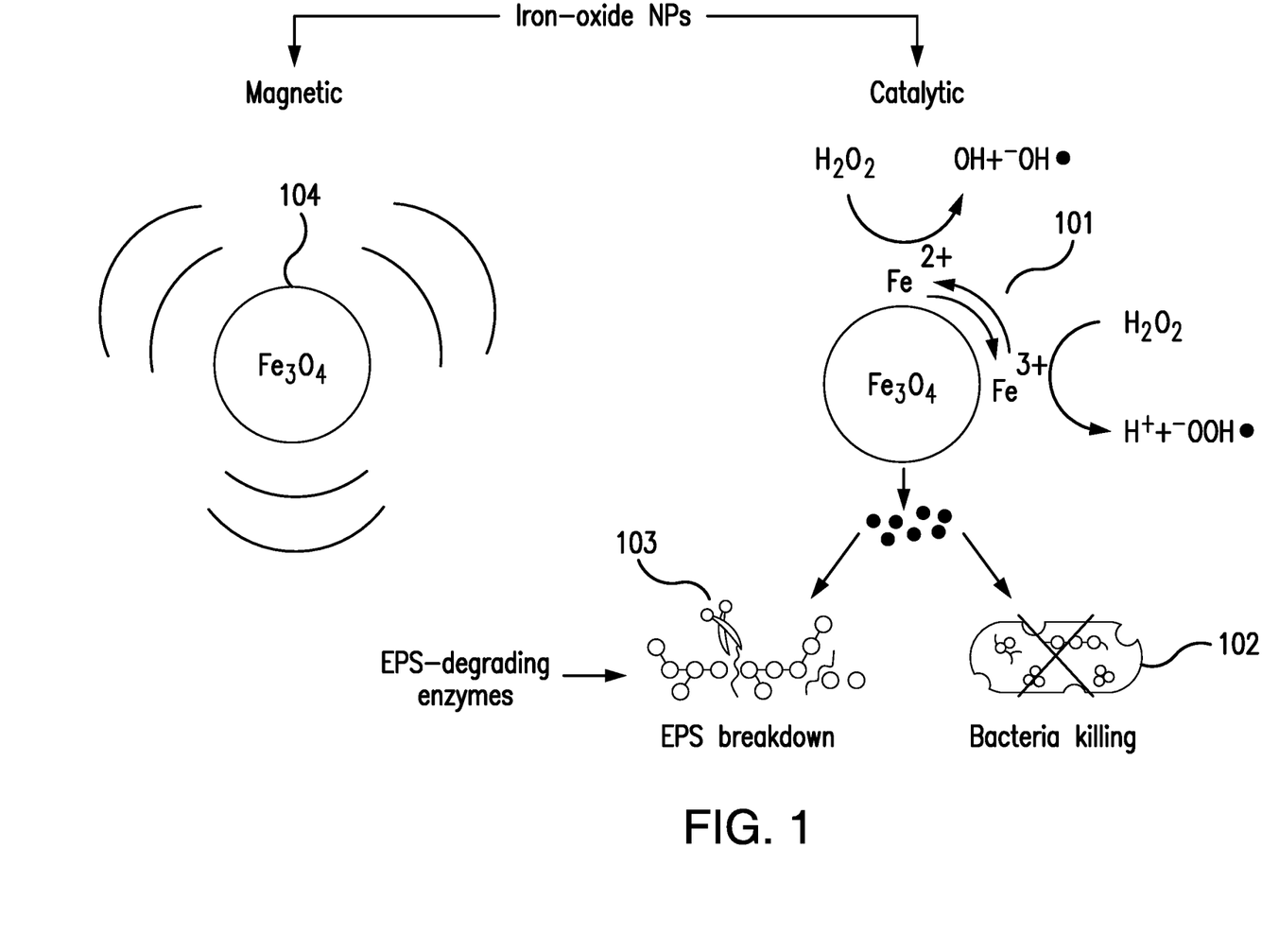
FIG. 1 is a diagram illustrating the dual catalytic-magnetic functionality of the iron oxide nanoparticles.

FIG. 1 is a diagram illustrating the dual catalytic-magnetic functionality of the iron oxide nanoparticles in accordance with an embodiment of disclosed subject matter. The iron oxide nanoparticles 101 can catalyze hydrogen peroxide ($H_2O_2$) to substantially eradicate bacteria 102 and degrade the biofilm matrix 103. The biofilm matrix degradation is key for disrupting the structural scaffold while also facilitating penetration and bacterial eradication. The bacterial eradication effect is substantially enhanced when the biofilm matrix is degraded. The biofilm matrix is degraded when it is sufficiently broken down to allow for bacterial eradication. The bacteria is substantially eradicated when the bacteria within the biofilm matrix is killed. The iron oxide nanoparticles can be magnetically activated 104 to actuate the iron oxide nanoparticles for assembly into biohybrid robots and to move the biohybrid robots to remove the biofilm debris from a surface.

Figure 2:
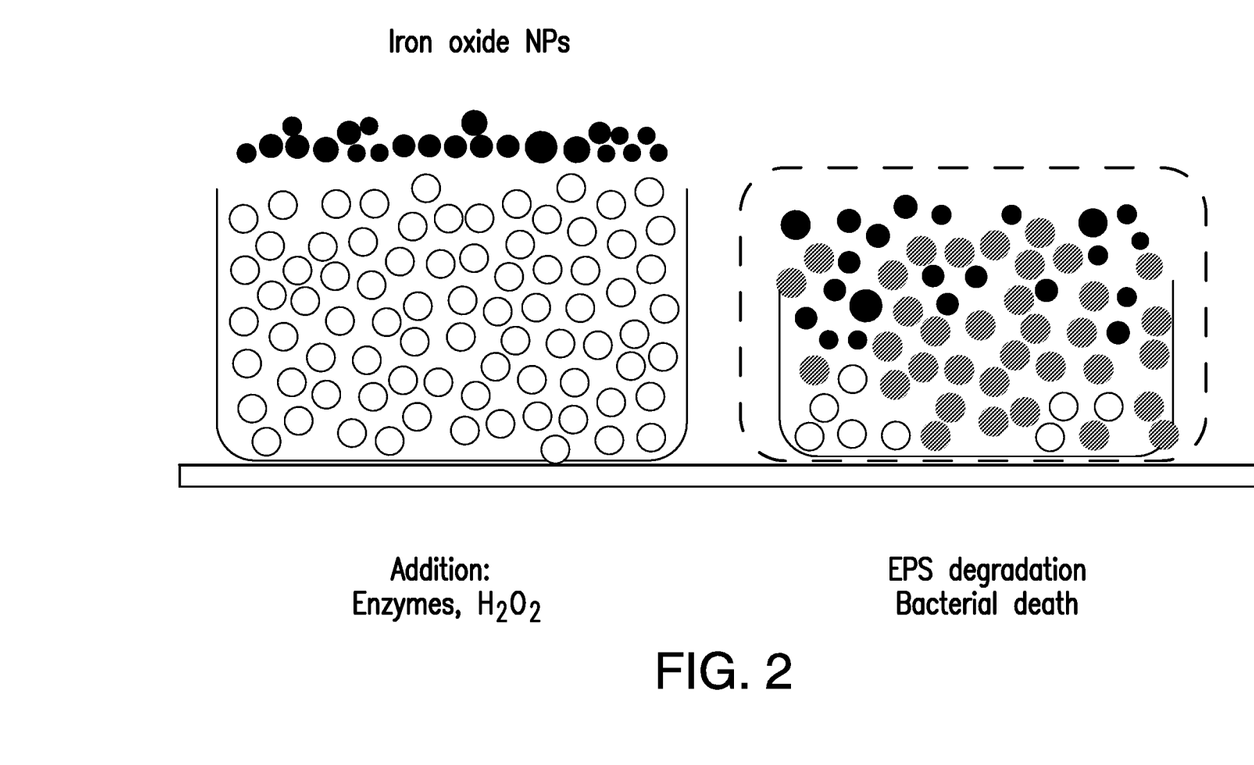
FIG. 2 is a diagram illustrating the application of a suspension of the iron oxide nanoparticles on biofilm.

FIG. 2 is a diagram illustrating the application of a suspension of the iron oxide nanoparticles on biofilm in accordance with an embodiment of disclosed subject matter. The iron oxide nanoparticles catalyze hydrogen peroxide ($H_2O_2$) to generate free radicals. These free radicals can substantially eradicate the bacteria embedded within a biofilm extracellular matrix. The free radicals can also degrade the biofilm extracellular matrix. This degradation occurs more slowly than the free radicals substantially eradicate the bacteria.

Figure 3:
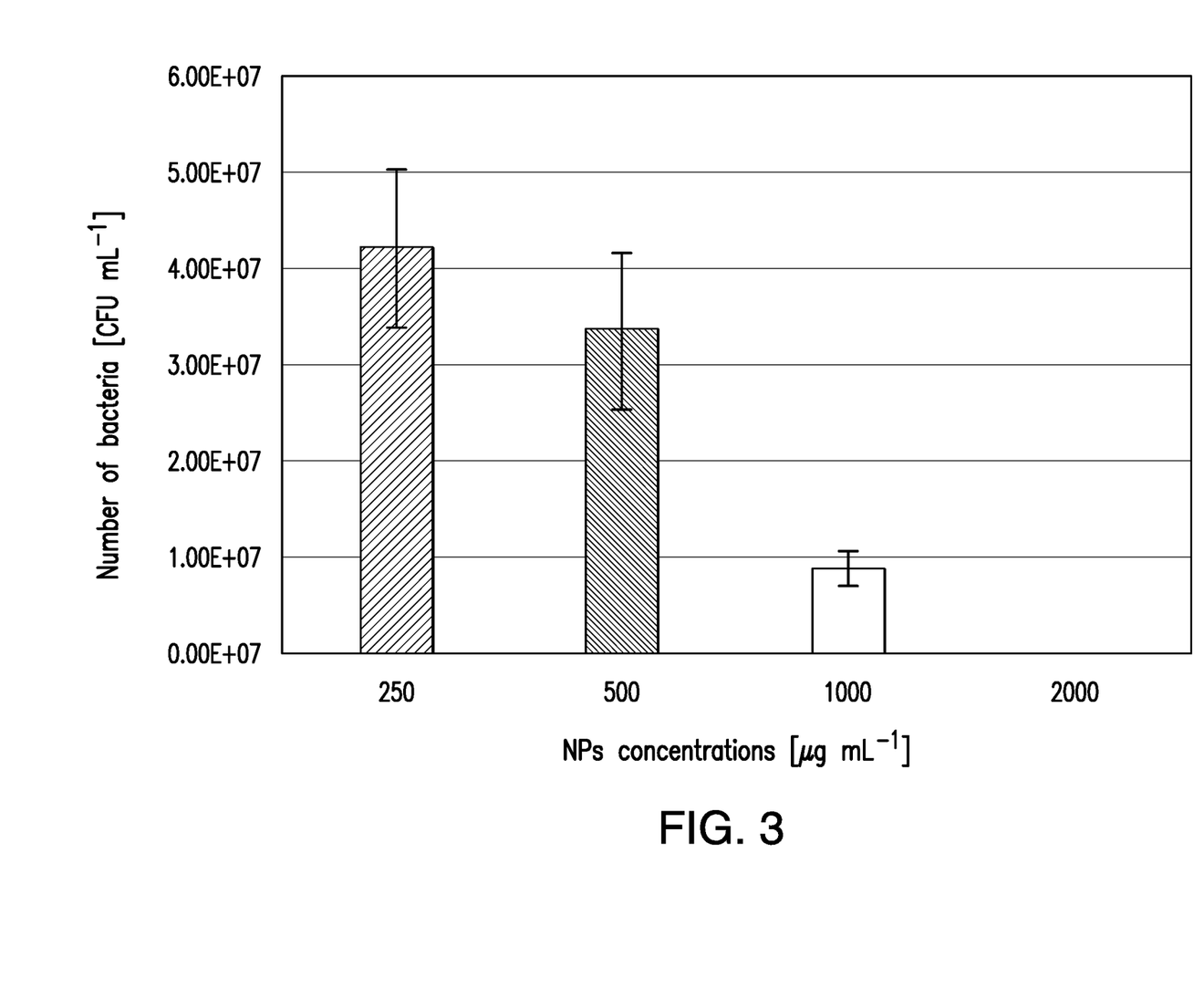
FIG. 3 depicts the dose dependent eradication activity of the iron oxide nanoparticles.

FIG. 3 depicts the dose dependent eradication activity of the iron oxide nanoparticles in accordance with an embodiment of disclosed subject matter. A concentration of between 500 micrograms and 5000 of iron oxide nanoparticles per milliliter of 50% glycerol achieves maximal efficacy for eradicating the bacteria.

Figure 4:
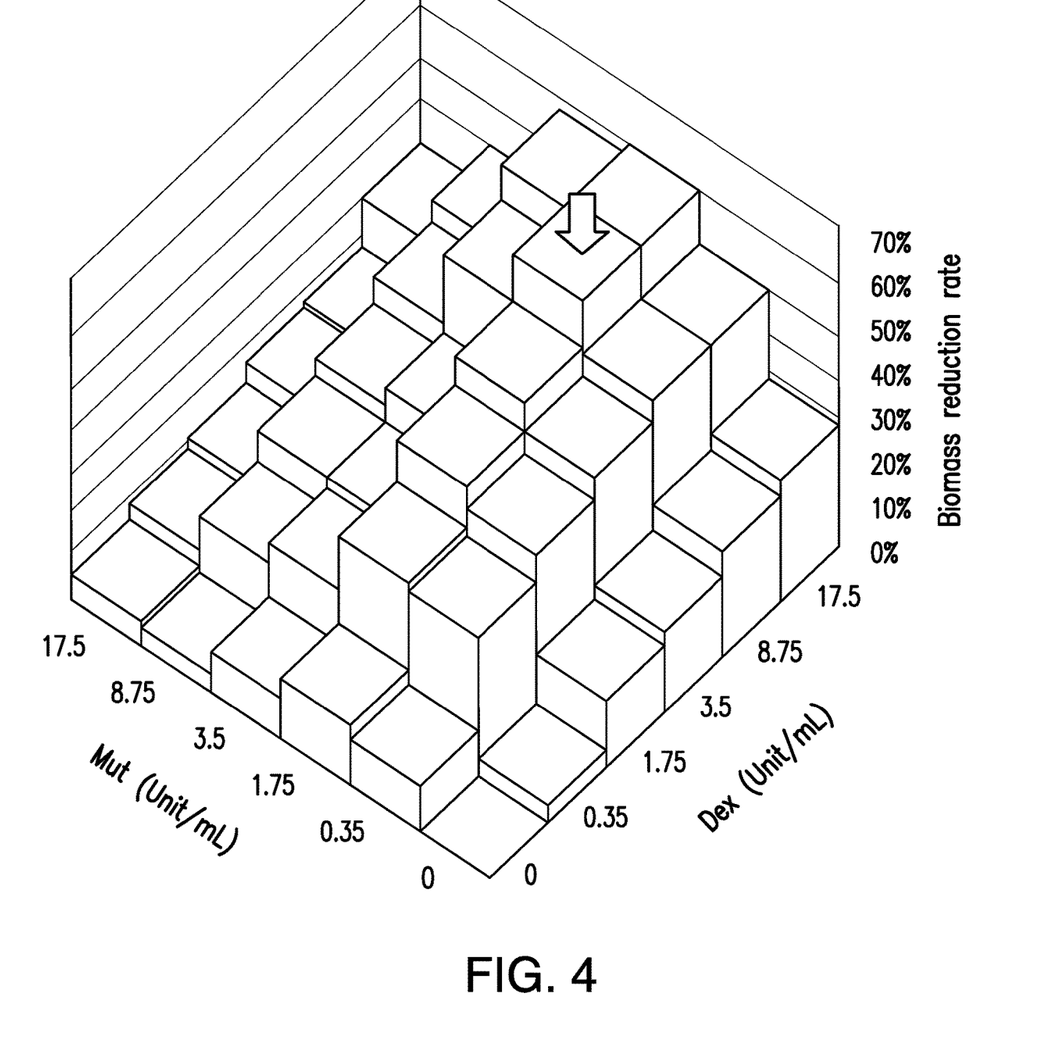
FIG. 4 depicts the dose dependent extracellular matrix degradation of the enzymes mutanase and dextranase.

FIG. 4 depicts the dose dependent extracellular matrix degradation of the enzymes mutanase and dextranase in accordance with an embodiment of disclosed subject matter. While the catalytic function of iron oxide nanoparticles degrades the biofilm matrix more slowly than it substantially eradicates the bacteria, the rate of degradation can be enhanced with enzymes including mutanase and dextranase. A combination of 1.75 U mutanase and 8.75 U dextranase achieves maximal efficacy for extracellular matrix degradation.

Figure 5:
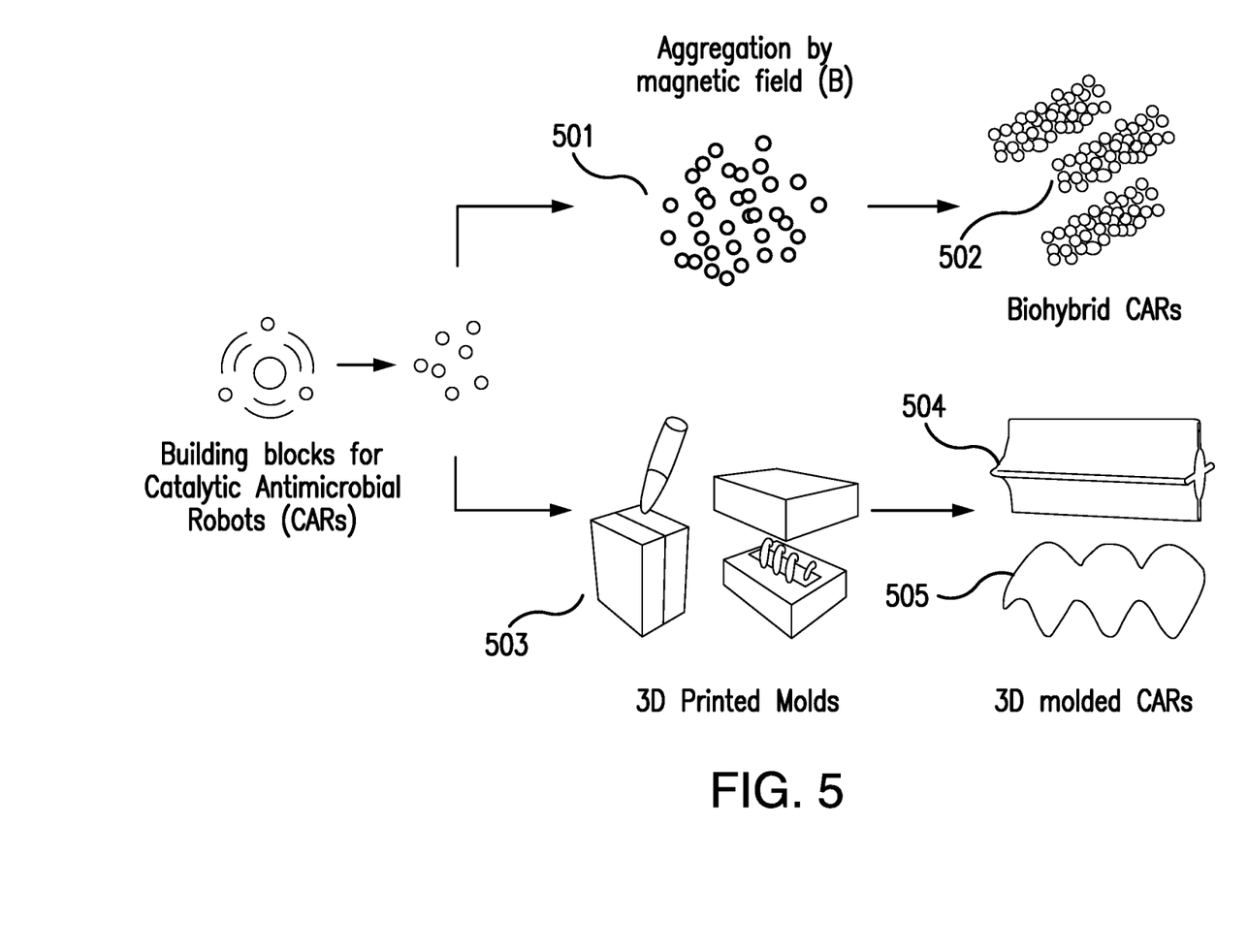
FIG. 5 is a diagram illustrating two platforms for the iron oxide nanoparticles.

FIG. 5 is a diagram illustrating two example platforms for the iron oxide nanoparticles in accordance with an embodiment of disclosed subject matter. These platforms enable the iron oxide nanoparticles to remove the biofilm debris. In the first platform, the iron oxide nanoparticles 501 are suspended and administered to a biofilm-covered surface. Once the iron oxide nanoparticles perform their catalytic function, they are actuated for assembly into biohybrid robots 502 using a magnetic element. In some embodiments, the magnetic element can be a permanent magnet or an an array of electromagnets that applies a magnetic field. In the second platform, the iron oxide nanoparticles are embedded in a hydrogel to form a soft robotic structure 503. In some embodiments, these structures can be vane-shaped 504 or double-helicoid-shaped 505. The shape of the structures can enable eradication of biofilm from confined and inaccessible locations.

Figure 6A:
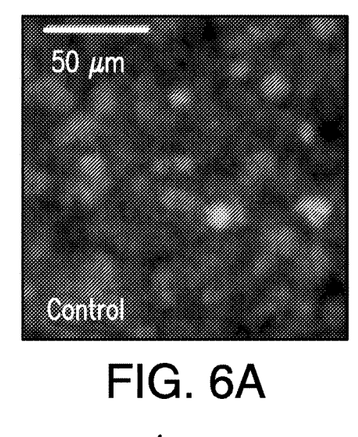
FIGS. 6A-6E depicts bacterial regrowth with and without the removal of the biofilm debris.
Figure 6B:
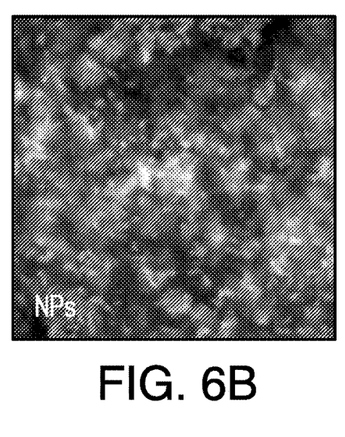
Figure 6C:
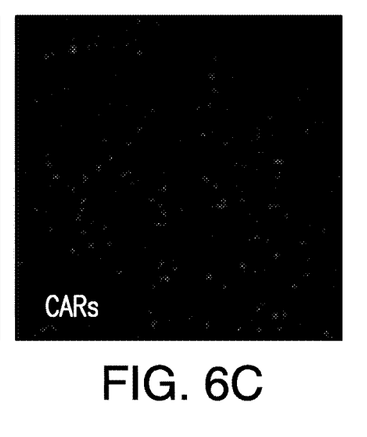
Figure 6D:
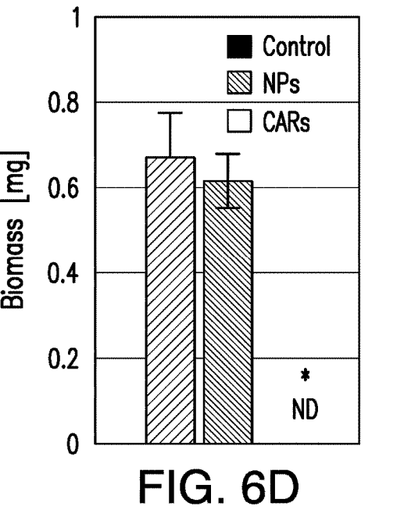
Figure 6E:
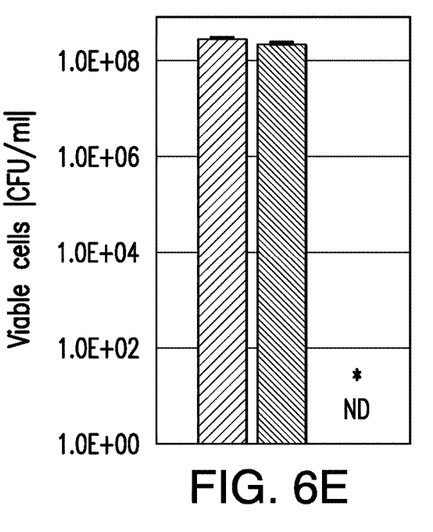

FIGS. 6A-6E depicts bacterial regrowth with and without the removal of the biofilm debris in accordance with an embodiment of disclosed subject matter. In FIG. 6A, a biofilm-covered surface was not treated with iron oxide nanoparticles. In FIG. 6B, a biofilm-covered surface was treated with iron oxide nanoparticles, but the biofilm debris was not removed from the surface. FIGS. 6A and 6B both show biofilm regrowth, demonstrating that biofilm retains the ability to rapidly reestablish itself if the biofilm debris is not removed. In FIG. 6C, a biofilm-covered surface was treated with iron oxide nanoparticles and the biofilm debris was removed from the surface via magnetic actuation. No biofilm regrowth was observed in FIG. 6C. FIGS. 6D and 6E show the amount of biomass and viable cells, respectively, on the surfaces in FIGS. 6A-6C. The surfaces in both FIGS. 6A and 6B show a high level of biomass and viable cells, whereas the surface in FIG. 6C shows no detected biomass or viable cells.

Figure 7:
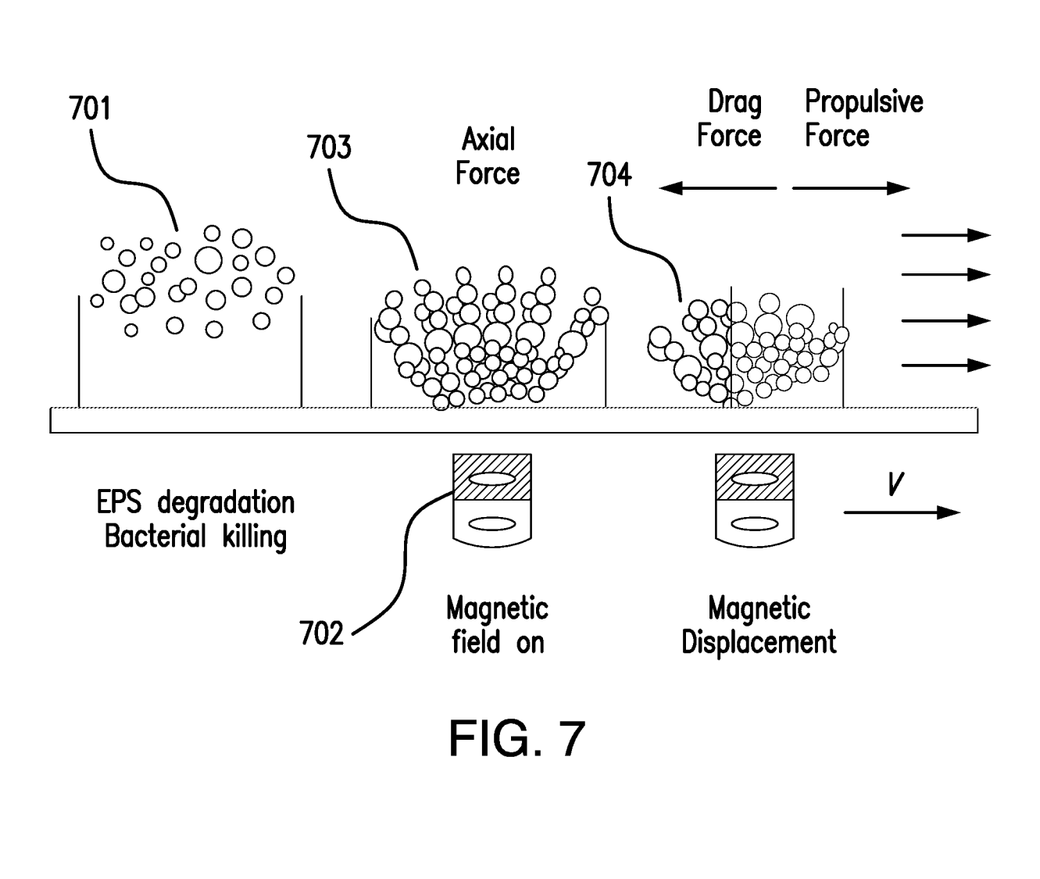
FIG. 7 illustrates iron oxide nanoparticles being manipulated by a magnetic element.

FIG. 7 illustrates iron oxide nanoparticles being manipulated by a magnetic element in accordance with an embodiment of disclosed subject matter. Once the iron oxide nanoparticles 701 substantially eradicate the bacteria and degrade the biofilm matrix, the magnetic element is activated 702. The magnetic element actuates the iron oxide nanoparticles for assembly into biohybrid robots 703 and controls the movement of the biohybrid robots 703. In some embodiment, the biohybrid robots can form rod-like structures 704 that can remove the biofilm debris by penetrating the biofilm debris and incorporating the biofilm debris into the biohybrid robots.

Figure 8:
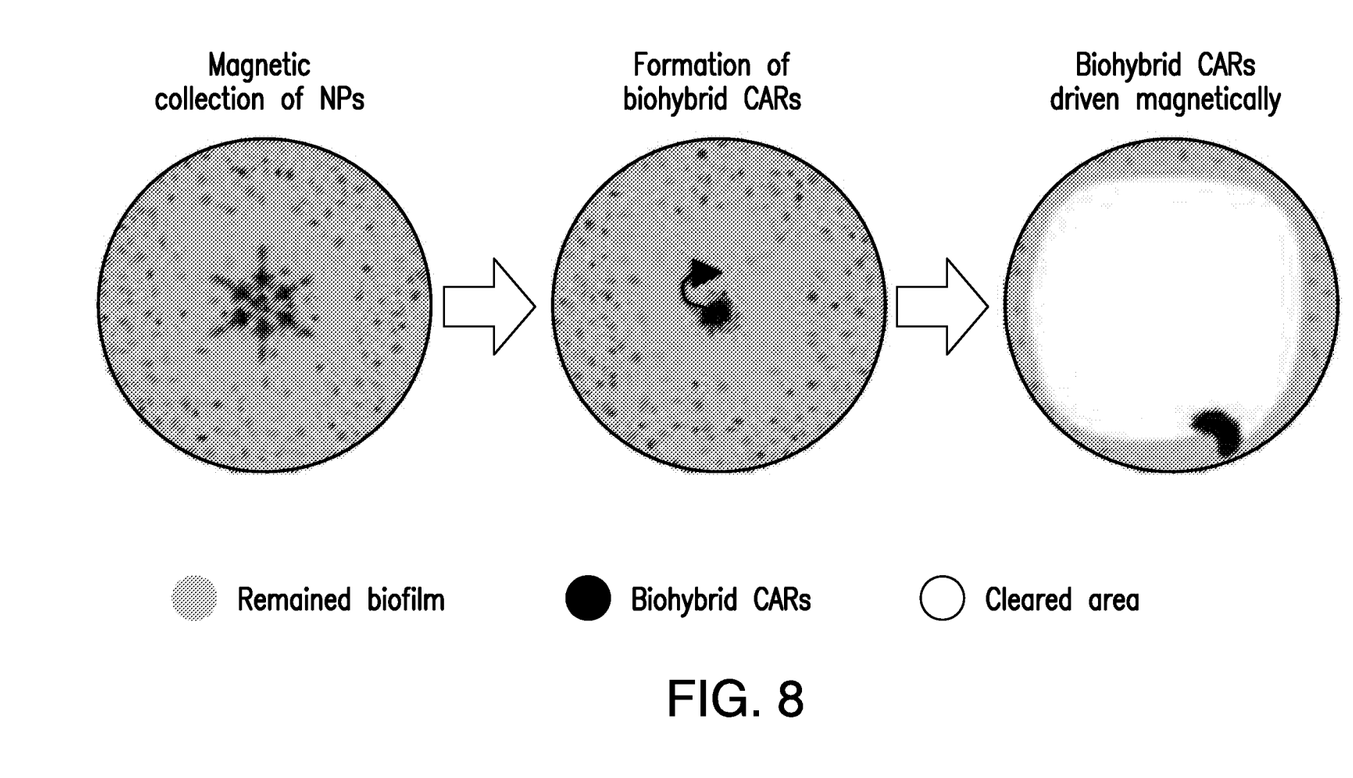
FIG. 8 is a diagram illustrating the removal of large areas of biofilm debris by magnetically-controlled movement of the iron oxide nanoparticles.

FIG. 8 is a diagram illustrating the removal of large areas of biofilm debris by magnetically-controlled movement of the biohybrid robots in accordance with an embodiment of disclosed subject matter. The biohybrid robots can move over broad swathes of the biofilm-covered surface. In some embodiments, the biohybrid robots can follow a defined trajectory that starts at the center of the biofilm-covered surface and progressively moves outward in a concentric manner. Following this trajectory, the biohybrid robots can clear the biofilm debris away from the contaminated surface. This trajectory can also continually pull individual iron oxide nanoparticles into the superstructure, thereby increasing its size and density.

Figure 9:
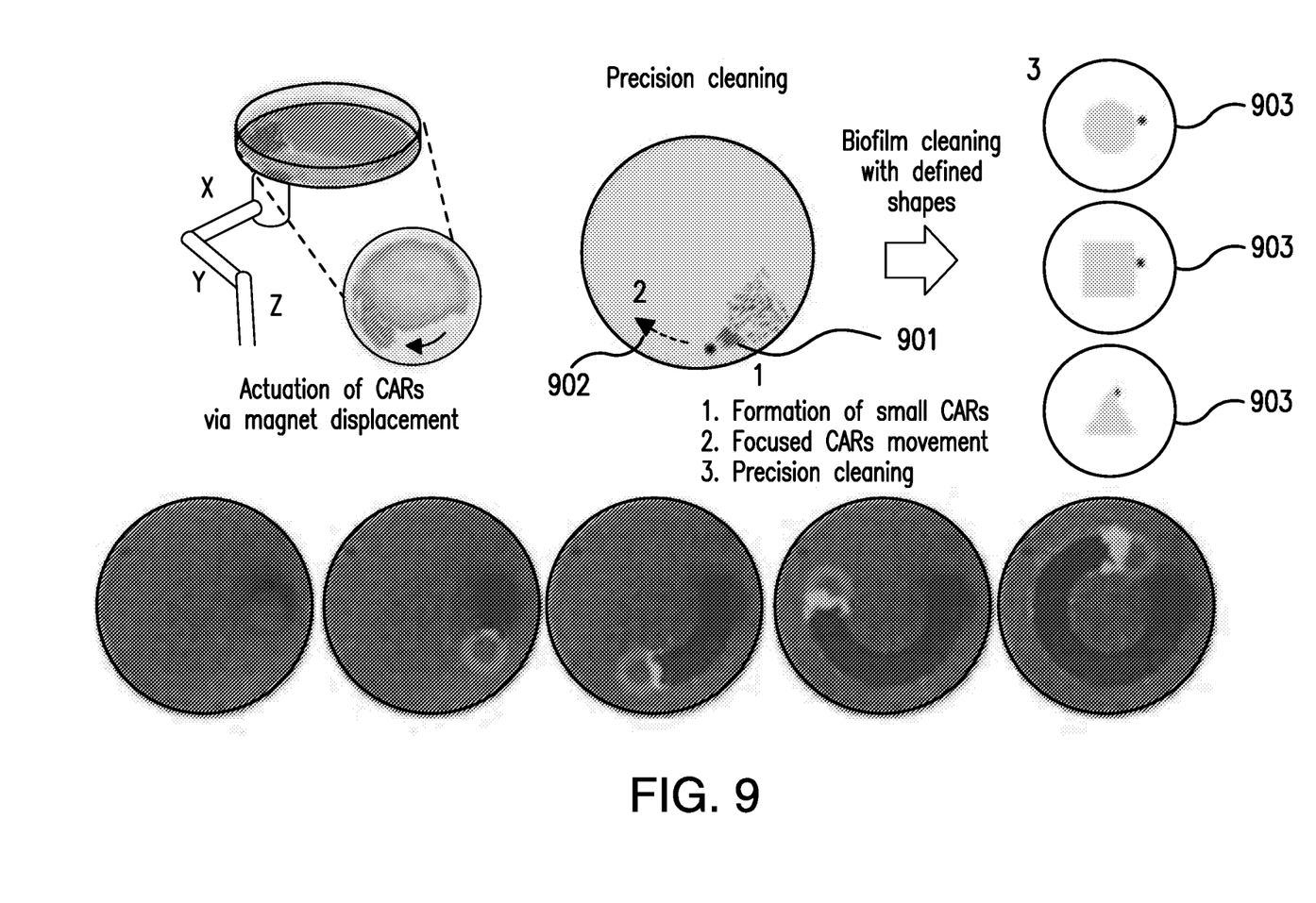
FIG. 9 illustrates the controlled movements of the iron oxide nanoparticles over well-defined paths with micrometer scale geometric precision.

FIG. 9 illustrates the controlled movements of the biohybrid robots over well-defined paths with micrometer scale geometric precision in accordance with an embodiment of disclosed subject matter. The biohybrid robots 901 can move over well-defined paths 902 with micrometer scale geometric precision 903. For example, biofilms can be removed without damaging nearby host-tissues or biofilms can be sampled at specific pathological sites. In some embodiments, the suspension of iron oxide nanoparticles can be concentrated near a biofilm-covered surface to enable localized biofilm eradication.

Figure 10:
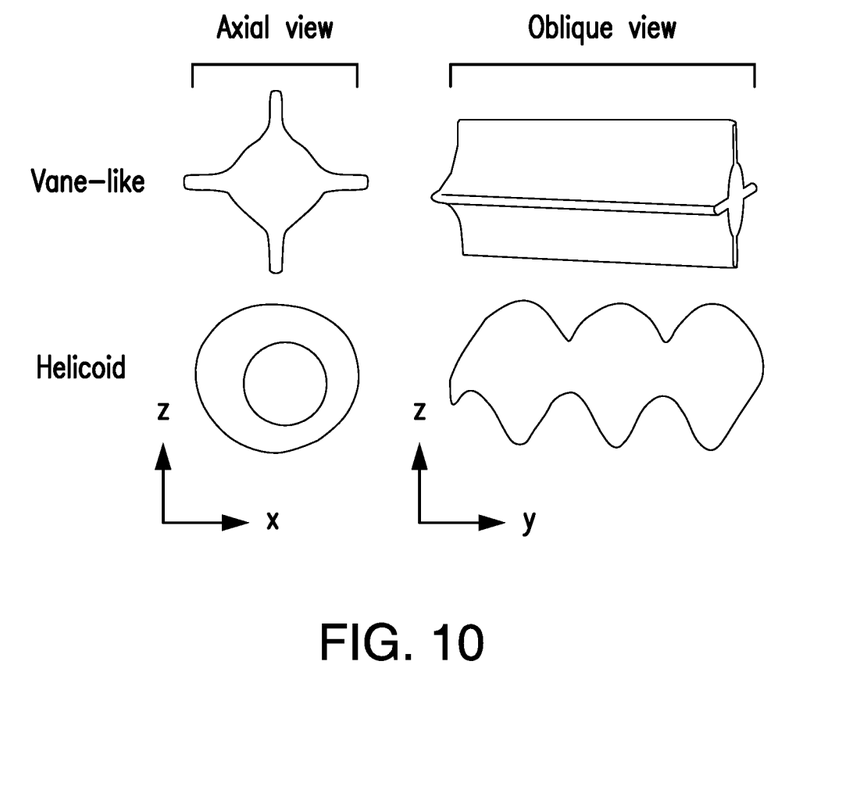
FIG. 10 illustrates model representations of a vane-shaped soft robotic structure and a double helicoid-shaped soft robotic structure.

FIG. 10 illustrates model representations of a vane-shaped soft robotic structure and a double helicoid-shaped soft robotic structure in accordance with an embodiment of disclosed subject matter. The iron oxide nanoparticles are embedded in a hydrogel to form a soft robotic structure. These structures can be shaped to perform specific tasks such as the eradication of biofilm from confined and inaccessible locations. The hydrogel can be permeable to $H_2O_2$, so the iron oxide nanoparticles can perform their catalytic function as described above. In some embodiments, the hydrogel can be a stimuli-responsive polymer. For example, the hydrogel can be a thermos-reversible gelifying agar polymer, or another stimuli-responsive polymer, including pH and temperature-responsive polymers. In some embodiments, the soft robotic structure can be 3% weight per volume agar and 10% weight per volume iron oxide nanoparticles. In some embodiments, both structures can be magnetized along their short axis to realign with a magnetic field direction.

Figure 11:
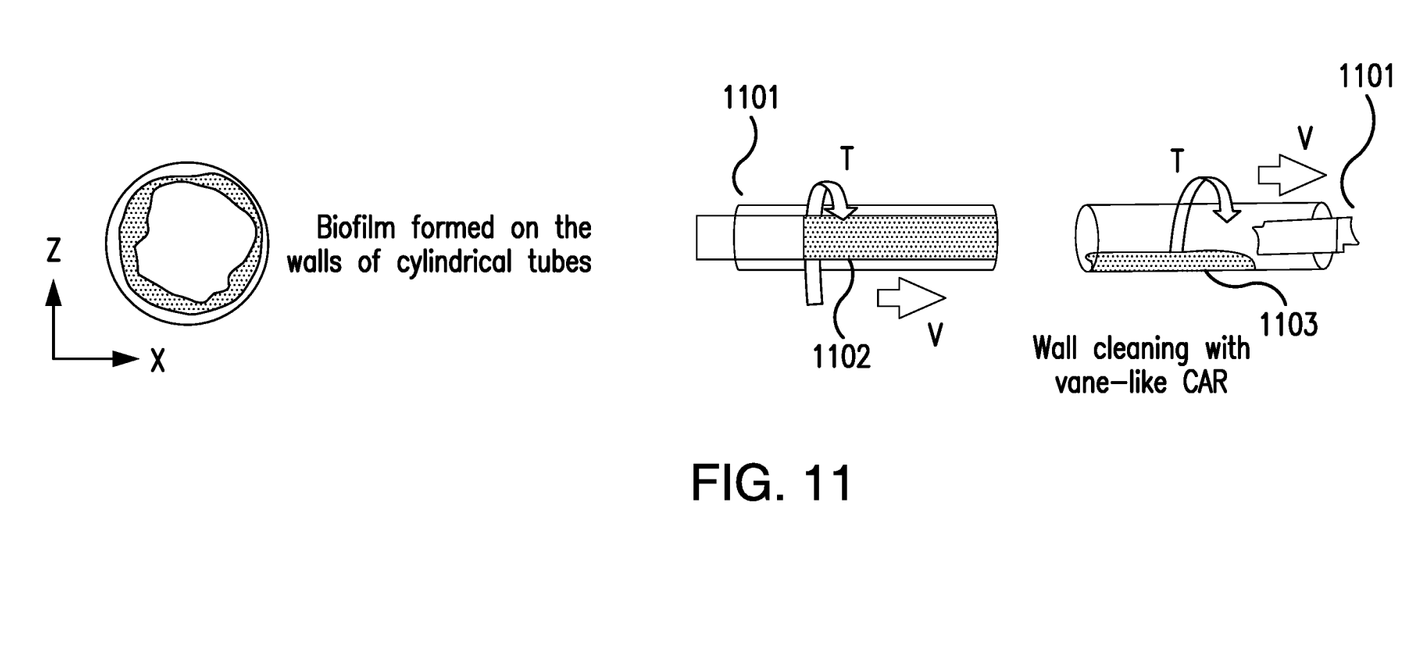
FIG. 11 is a diagram illustrating the vane-shaped soft robotic structure cleaning biofilm on the wall of a cylindrical tube.

FIG. 11 is a diagram illustrating the vane-shaped soft robotic structure cleaning biofilm on the wall of a cylindrical tube in accordance with an embodiment of disclosed subject matter. The vane shape can have a central core with fin-like structures. The vane-shaped structure 1101 can rotate with an applied magnetic torque from a magnetic element can move forward at a velocity by applying a force using the magnetic element. This rotation can generate localized fluid shear stress and scrub the curved surface of a tube 1102. As the vane-shaped structure moves forward, it sweeps over the curved surface, thereby scraping and displacing biofilm debris. The displaced biofilm debris forms a pile 1103 that can be removed from the tube by flushing it with water.

Figure 12:
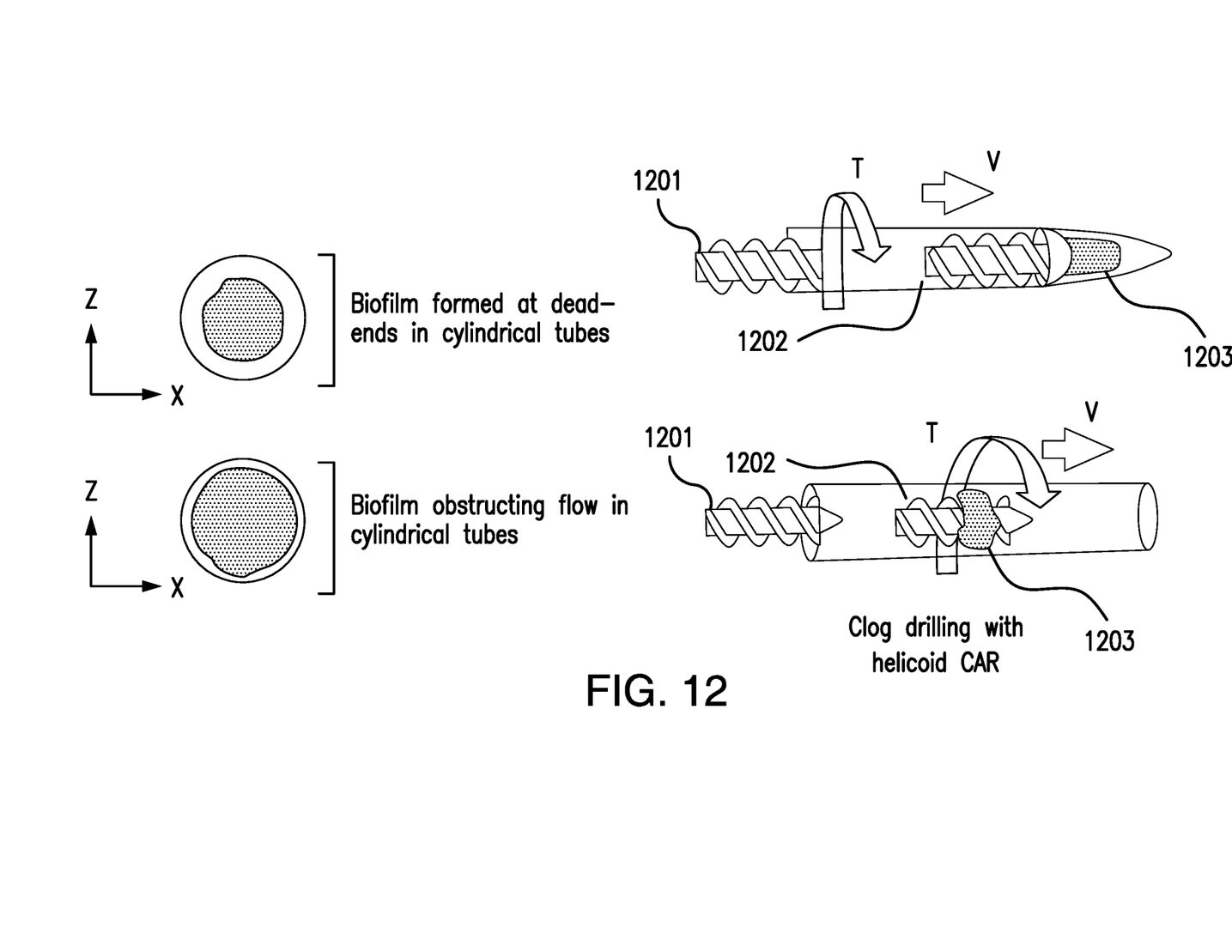
FIG. 12 is a diagram illustrating the double helicoid-shaped soft robotic structure drilling through a biofilm clog in a cylindrical tube.

FIG. 12 is a diagram illustrating the double helicoid-shaped soft robotic structure drilling through a biofilm clog in a cylindrical tube in accordance with an embodiment of disclosed subject matter. The double helicoid shape can have two helices wrapped around a central axis. The chiral geometry of the double helicoid-shaped structure 1201 enables it to move forward with an applied magnetic torque from a magnetic element, thereby propelling the structure in a corkscrew-like fashion 1202. Due to this motion, the double helicoid-shaped structure can drill through biofilm occlusions 1203 and clear biofilms from walls. As the structure moves forward, it forms a pile that can be removed from the tube by flushing it with water.

Figure 13A:
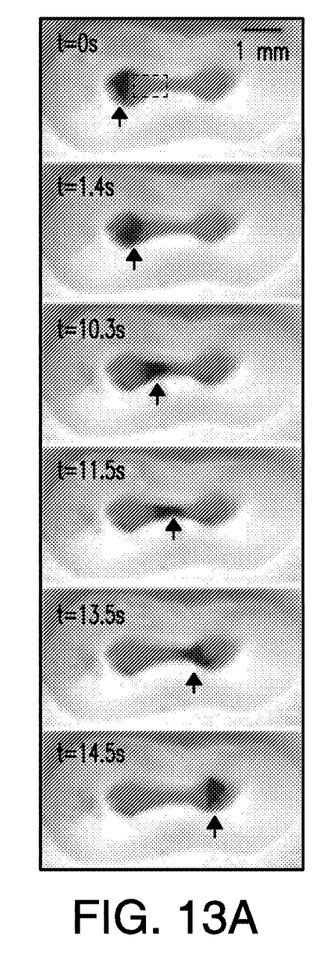
FIGS. 13A-C depict an example of the use of iron oxide nanoparticles for endodontic disinfection and to treat biofilm in the tooth canal.
Figure 13B:
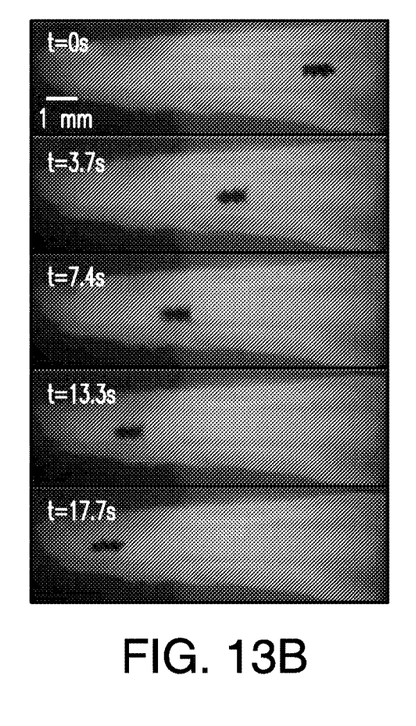
Figure 13C:
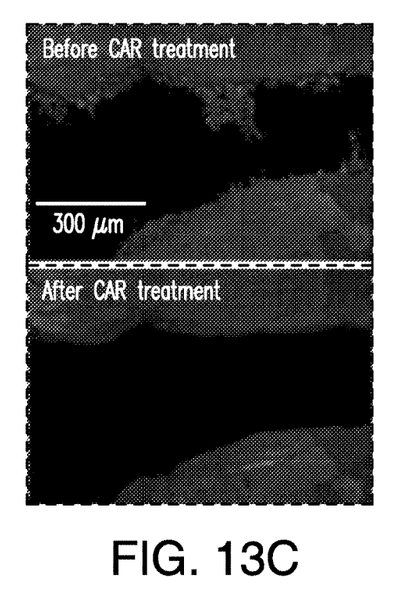

FIGS. 13A-C depict an example of the use of biohybrid robots to treat biofilm in the tooth canal in accordance with an embodiment of disclosed subject matter. In particular, FIGS. 13A and 13B depict cross-sectional views of the tooth canal. In FIG. 13A, iron oxide nanoparticles can be administered to an isthmus, a narrow corridor of approximately 200 to 600 micrometers in width between two root canals, and actuated for assembly into biohybrid robots that can then be moved from one end to another, transversing the entire extent of the isthmus. As shown in FIG. 13B, double helicoid-shaped soft robotic structure made of iron oxide nanoparticles can also be magnetically controlled across the extent of the tooth canal (FIG. 13B). FIG. 13A shows a longitudinal cross-section of the tooth canal. At t=0 s, the biohybrid robot is in one of the root canals. At t=11.5 s, the biohybrid robot passes through the isthmus. At t=14.5 s, the biohybrid robot reaches the other root canal. FIG. 13B shows a latitudinal section of the tooth canal. At t=0 s, the double helicoid-shaped soft robot is at a top of the tooth canal. The biohybrid robot then moves down the tooth canal until reaching the bottom of the tooth canal at t=17.7 s. FIG. 13C depicts the eradication of biofilm in the isthmus by biohybrid robots as shown before and after treatment; the biofilms were fluorescently labelled for visualization.

More generally, the disclosed techniques can be applied to eradicate bacteria within a biofilm matrix, degrade the matrix and remove biofilm debris on biotic surfaces such as teeth and mucosal surfaces, as well as abiotic surfaces such as implanted medical devices and catheters, or surgical instruments including endoscopes, cannulas/cannulae thereby preventing infections and medical complications in patients. Furthermore, the disclosed techniques can be applied to eradicate bacteria within a biofilm matrix, degrade the matrix and remove biofilm debris in natural and industrial settings such as man-made aquatic systems (e.g., cooling towers, pools, aquariums and spas), glass/plastic surfaces including windows and food packaging and the interiors of pipes, water lines and other enclosed surfaces.

The foregoing merely illustrates the principles of the disclosed subject matter. Various modifications and alterations to the described embodiments will be apparent to those skilled in the art in view of the teachings herein. It will thus be appreciated that those skilled in the art will be able to devise numerous techniques which, although not explicitly described herein, embody the principles of the disclosed subject matter and are thus within its spirit and scope.

The invention claimed is:

1. A system for eradicating bacteria within a biofilm matrix, matrix degradation, and biofilm removal comprising:
    a suspension of $H_2O_2$ and iron oxide nanoparticles, adapted to substantially eradicate the bacteria and degrade the biofilm matrix; wherein the iron oxide nanoparticles are embedded in a hydrogel to form a soft robotic structure configured to enable eradication of biofilm from confined locations; and
    a magnetic element, adapted to actuate the iron oxide nanoparticles by a magnetic field for assembly into biohybrid robots suitable for removal of biofilm debris caused by bacterial eradication and matrix degradation, wherein the soft robotic structure is vane-shaped or double helicoid-shaped, adapted to scrape and displace the biofilm debris from a wall of an enclosed surface.

2. The system of claim 1, wherein the suspension comprises 2000 micrograms of iron oxide nanoparticles per milliliter of 50% glycerol.

3. The system of claim 2, wherein the suspension comprises at least one enzyme, adapted to degrade the biofilm matrix.

4. The system of claim 3, wherein the at least one enzyme includes mutanase and dextranase.

5. The system of claim 2, wherein the suspension comprises 1% $H_2O_2$ and 1.75 U/8.75 U mutanase/dextranase.

6. The system of claim 1, wherein the magnetic element comprises at least one of a permanent magnet or an array of electromagnets, adapted to apply a magnetic field to the biofilm to actuate the iron oxide nanoparticles to assemble into biohybrid robots.

7. The system of claim 6, wherein the permanent magnet moves the biohybrid robots, adapted to remove the biofilm debris from the biofilm matrix.

8. The system of claim 7, wherein the suspension of $H_2O_2$ and iron oxide nanoparticles is administered to a tooth canal for endodontic disinfection or biofilm removal.

9. The system of claim 7, wherein the biohybrid robots are adapted to move through isthmuses to disrupt biofilm and remove the biofilm debris.

\* \* \* \* \*